(12) United States Patent
Kim et al.

(10) Patent No.: US 8,074,610 B2
(45) Date of Patent: Dec. 13, 2011

(54) MUTUALLY CONVERTIBLE BOILER BETWEEN NORMAL TYPE AND CONDENSING TYPE

(75) Inventors: Won-Kyu Kim, Pyungtaek-si (KR); Myung-Gi Min, Pyungtaek-si (KR); Chan-Woo Park, Osan-si (KR)

(73) Assignee: Kyungdong Navien Co., Ltd., Pyungtaek-si (KR)

( * ) Notice: Subject to any disclaimer, the term of this patent is extended or adjusted under 35 U.S.C. 154(b) by 807 days.

(21) Appl. No.: 10/588,664

(22) PCT Filed: Dec. 15, 2004

(86) PCT No.: PCT/KR2004/003302
§ 371 (c)(1),
(2), (4) Date: Oct. 22, 2008

(87) PCT Pub. No.: WO2005/078358
PCT Pub. Date: Aug. 25, 2005

(65) Prior Publication Data
US 2009/0050077 A1 Feb. 26, 2009

(30) Foreign Application Priority Data

Feb. 16, 2004 (KR) .................. 10-2004-0009975
Mar. 9, 2004 (KR) .................. 10-2004-0015914

(51) Int. Cl.
*F24H 1/34* (2006.01)
(52) U.S. Cl. ..................... 122/15.1; 122/18.1
(58) Field of Classification Search ............. 122/15.1, 122/18.1, 13.01; 126/361.1, 362.1
See application file for complete search history.

(56) References Cited

U.S. PATENT DOCUMENTS

| 4,846,150 | A | * | 7/1989 | Maton | 122/18.2 |
| 5,546,760 | A | * | 8/1996 | Cook et al. | 62/497 |
| 7,614,366 | B2 | * | 11/2009 | Arnold et al. | 122/18.1 |
| 7,836,856 | B2 | * | 11/2010 | Mullen et al. | 122/155.2 |
| 7,958,852 | B2 | * | 6/2011 | Kim | 122/1 B |
| 7,971,560 | B2 | * | 7/2011 | Gordon et al. | 122/15.1 |
| 7,992,526 | B2 | * | 8/2011 | Ritsema et al. | 122/18.3 |
| 2009/0165733 | A1 | * | 7/2009 | Ferguson | 122/18.3 |

FOREIGN PATENT DOCUMENTS

| EP | 0507167 A2 | 10/1992 |
| JP | 57-105526 | 6/1982 |
| JP | 59-112146 | 6/1984 |
| JP | 06-313627 | 11/1994 |
| JP | 2001-336836 | 12/2001 |

* cited by examiner

*Primary Examiner* — Gregory A Wilson
(74) *Attorney, Agent, or Firm* — Greer, Burns & Crain, Ltd.

(57) ABSTRACT

A boiler includes a combustion chamber, a heat exchange section, and an outer housing. Coupling holes are formed in the outer housing, a circulation chamber is formed at a lower portion of the outer housing, and a burner is provided at an upper portion of the combustion chamber so as to generate heat in a downward direction thereof. The combustion chamber is vertically installed in one of the coupling holes, and a lower portion of the combustion chamber is communicated with the circulation chamber. The heat exchange section includes first and second heat exchangers and is vertically installed in the outer housing adjacent to the combustion chamber. An upper portion of the heat exchange section is coupled to one of the coupling holes and a lower portion of the heat exchange section is communicated with the circulation chamber.

5 Claims, 6 Drawing Sheets

MUTUALLY CONVERTIBLE BOILER BETWEEN NORMAL TYPE AND CONDENSING TYPE

TECHNICAL FIELD

The present invention relates to a boiler which is convertible between a normal type and a condensing type, and more particularly to a boiler which can be easily converted from a normal type oil boiler to a condensing type oil boiler or vice versa by commonly using an outer housing and a heat exchanger in both types of the boiler so that it is not necessary to provide separate manufacturing equipment to accommodate both types of the boiler, thereby significantly reducing manufacturing costs for the boiler, and which can be easily fabricated and can reduce a size and a weight thereof by vertically installing a latent heat exchanger in an outer housing of the boiler together with a combustion chamber and a main heat exchanger.

BACKGROUND ART

Boilers are appliances for feeding hot water to separate rooms in homes and offices after heating water using combustion heat, which is generated when burning fuel in the boilers. The boilers have come into wide use for the purpose of heating houses or feeding hot water in the houses. The boilers are classified into various types according to the sort of heat sources for heating water or fuel used in the boilers. For instance, the boilers are classified into gas boilers using LPG or LNG and oil boilers using burning-oil according to fuel used in the boilers.

In addition, the boilers are classified into normal type boilers and condensing type boilers. The condensing type boiler has been developed so as to reuse energy, which may be wasted in the normal type boiler. The condensing type boiler operates as follows:

Fuel of the boiler includes hydrogen ($H_2$), which reacts with oxygen ($O_2$) when the fuel is burned so that water ($H_2O$) is created while generating heat. Such water is converted into water vapor due to heat contained in water and the water vapor is exhausted to an exterior in the form of an exhaust gas. Accordingly, if the temperature of the water vapor is lowered below 100° C., the water vapor is again converted into water.

When a phase of a material is shifted, latent heat is emitted or absorbed from/into the material. Therefore, latent heat is generated when the water vapor contained in the exhaust gas is liquefied into water. The condensing type boiler includes a latent heat exchanger so as to heat water by using the latent heat. According to the condensing type boiler, sensible heat contained in the exhaust gas and latent heat contained in the water vapor are simultaneously retrieved, thereby improving the thermal efficiency of the boiler up to 95 to 105%. Therefore, it is preferred to widely spread the high-efficiency condensing type boilers in order to reduce energy consumption.

However, in order to apply the condensing scheme to the oil boiler, a latent heat exchanger for retrieving the latent heat from the exhaust gas must be installed in the boiler separately from a main heat exchanger capable of absorbing combustion sensible heat. Differently from the gas boiler, the oil boiler may generate strong acidic condensing water due to sulfuric components contained in oil fuel, so the latent heat generator must be fabricated by using a material having superior endurance against the strong acidic condensing water. For this reason, the condensing type oil boiler must be provided with the main heater exchanger and the latent heat exchanger, which are fabricated by using mutually different materials.

FIG. 1 is a schematic sectional view of a conventional condensing type oil boiler. The conventional condensing type oil boiler includes a main heat exchanger 12 for absorbing sensible heat generated when fuel is burned in the boiler and a latent heat exchanger 16 aligned in parallel to the main heat exchanger 12 while forming a predetermined space therebetween so as to absorb remaining heat and latent heat from an exhaust gas fed to the main heat exchanger 12. The main heat exchanger 12 is provided at a lower portion thereof with a combustion chamber 11, in which fuel is burned by means of a burner 10. In addition, a plurality of funnels 14 are provided in the main heat exchanger 12. The funnels 14 are connected with an upper portion of the combustion chamber 11 so as to convey an exhaust gas generated from the combustion chamber 11. Water reservoirs 13 are provided between an outer peripheral portion of the combustion chamber 11 and the funnels 14 in order to circulate hot water. Sensible heat of the exhaust gas, which is generated when the fuel is burned in the boiler, is applied to hot water being circulated through the water reservoirs 13.

Arrows shown in FIG. 1 represent a flowing direction of the exhaust gas. As shown in FIG. 1, the exhaust gas flowing upwards from the combustion chamber 11 of the main heat exchanger 12 along the funnels 14 is transferred to a noise-absorbing container 15, which connects an upper portion of the main heat exchanger 12 with an upper portion of the latent heat exchanger 16, so that the exhaust gas is introduced into the latent heat exchanger 16. The latent heat exchanger 16 has a cylindrical structure and the upper portion of the latent heat exchanger 16 is communicated with the noise-absorbing container 15. The latent heat exchanger 16 is provided at an inner portion thereof with a plurality of funnels 18, which are communicated with a funnel support 19 provided at a lower portion of the latent heat exchanger 16. In addition, water reservoirs 17 are provided between the funnels 18 so as to store hot water therein. Latent heat of the exhaust gas passing through the latent heat exchanger 16 is transferred to hot water stored in the water reservoirs 17.

Generally, since condensing water, which is generated because water vapor contained in the exhaust gas is liquefied while passing through the latent heat exchanger 16, represents a strong acidic property, the condensing water may cause environmental contamination. For this reason, the funnel support 19 for collecting the condensing water and a neutralization unit 21 for neutralizing the condensing water collected in the funnel support 19 are provided at a lower portion of the funnels 18. One end of the funnel support 19 is communicated with the funnels 18 of the latent heat exchanger 16 and the other end of the funnel support 19 is coupled with a funnel 20 so that the exhaust gas passing through the funnels 18 may be discharged to an exterior through the funnel 20.

However, the conventional condensing type oil boiler having the above structure presents a problem in that the latent heat exchanger for retrieving latent heat from the exhaust gas is installed separately from the main heat exchanger, so separate manufacturing equipment and jigs must be provided for the conventional condensing type oil boiler. That is, in order to manufacture the conventional condensing type oil boiler, a separate assembling line must be provided and additional labor force is supported. In addition, since parts for the condensing type oil boiler cannot be used for the normal type oil boiler, the manufacturing cost may be increased while reducing the productivity.

Furthermore, the conventional condensing type boiler having the above structure presents another problem in that a volume and a weight of the conventional condensing type boiler may increase as compared with those of the normal type oil boiler, which can absorb only sensible heat from the exhaust gas. For this reason, a relatively large space is required for installing the conventional condensing type boiler, while complicating the manufacturing processes for the conventional condensing type boiler.

DISCLOSURE OF THE INVENTION

Therefore, the present invention has been made in view of the above-mentioned problems, and it is an object of the present invention to provide a boiler which can be easily converted from a normal type oil boiler to a condensing type oil boiler or vice versa by forming a heat exchange section including first and second heat exchangers, which are shielded from each other by a partition if necessary, so that it is not necessary to provide separate manufacturing equipment according to the types of the boiler, thereby reducing manufacturing costs for the boiler.

Another object of the present invention is to provide a boiler which can be easily converted from a normal type boiler to a condensing type boiler or vice versa, and which can be easily fabricated in a small size with a reduced weight by constructing the boiler with a combustion chamber having a burner for generating heat in a downward direction, a main heat exchanger for absorbing sensible heat generated from the combustion chamber, and a latent heat exchanger for absorbing remaining heat and latent heat from an exhaust gas fed from the main heat exchanger in such a manner that the combustion chamber, the main heat exchanger and the latent heat exchanger are vertically installed in an outer housing of the boiler.

In order to accomplish the above objects, according to one aspect of the present invention, there is provided a boiler convertible between a normal type and a condensing type, the boiler comprising: a combustion chamber for generating high-temperature combustion heat by burning fuel therein; a heat exchange section for applying heat to heating water by absorbing the high-temperature combustion heat; and an outer housing formed at an inner portion thereof with a water reservoir for circulating the heating water, wherein coupling holes are formed in the outer housing, a circulation chamber is formed at a lower portion of the outer housing, a burner is provided at an upper portion of the combustion chamber so as to generate heat in a downward direction thereof, the combustion chamber is vertically installed in one of the coupling holes, a lower portion of the combustion chamber is communicated with the circulation chamber, the heat exchange section includes first and second heat exchangers and is vertically installed in the outer housing adjacent to the combustion chamber, an upper portion of the heat exchange section is coupled to one of the coupling holes and a lower portion of the heat exchange section is communicated with the circulation chamber, and a funnel is provided at an upper portion of the outer housing so as to discharge an exhaust gas derived from combustion of the fuel in the combustion chamber, and a noise-absorbing container is provided at the upper portion of the outer housing so as to connect the funnel with the outer housing.

According to another aspect of the present invention, there is provided a boiler convertible between a normal type and a condensing type, the boiler comprising: a combustion chamber for generating high-temperature combustion heat by burning fuel therein; a heat exchange section including a main heat exchanger for absorbing sensible heat from the high-temperature combustion heat and a latent heat exchanger for absorbing remaining heat and latent heat from an exhaust gas outputted from the main heat exchanger, the heat exchange section applying heat to heating water; and an outer housing formed at an inner portion thereof with a water reservoir for circulating the heating water, wherein coupling holes are formed in the outer housing, a circulation chamber is formed at a lower portion of the outer housing, the combustion chamber is vertically installed in one of the coupling holes, a burner is provided at an upper portion of the combustion chamber so as to generate heat in a downward direction thereof, a lower portion of the combustion chamber is communicated with the circulation chamber, the main heat exchanger is vertically installed in the outer housing adjacent to the combustion chamber, the main heat exchanger is accommodated in one of the coupling holes and a lower portion of the main heat exchanger is communicated with the circulation chamber, the latent heat exchanger is vertically installed in the outer housing adjacent to the main heat exchanger and is accommodated in one of the coupling holes, a lower portion of the latent heat exchanger is shielded from the circulation chamber by means of a partition wall formed in the circulation chamber, a funnel is communicated with the latent heat exchanger through a funnel support so as to discharge an exhaust gas of the latent heat exchanger to an exterior, and a noise absorbing chamber is coupled to an upper portion of the outer housing so as to seal the upper portion of the outer housing while guiding the exhaust gas from the main heat exchanger to the latent heat exchanger.

According to still another aspect of the present invention, there is provided a method for converting a normal type oil boiler into a condensing type oil boiler or vice versa, the method comprising the steps of: inserting a funnel support into a circulation chamber from a lateral portion of an outer housing of the boiler, thereby forming a partition wall for shielding the circulation chamber from a latent heat exchanger; separating a funnel from a noise-absorbing container and sealing an upper portion of the noise-absorbing container; and allowing the funnel to communicate with the latent heat through the funnel support in such a manner that a main heat exchanger absorbs sensible heat from an exhaust gas and the latent heat exchanger absorbs latent heat from the exhaust gas while the exhaust gas is being circulated through a combustion chamber, the circulation chamber, the noise-absorbing container, the latent heat exchanger, the funnel support and the funnel.

BRIEF DESCRIPTION OF THE DRAWINGS

The foregoing and other objects, features and advantages of the present invention will become more apparent from the following detailed description when taken in conjunction with the accompanying drawings in which.

BEST MODE FOR CARRYING OUT THE INVENTION

Reference will now be made in detail to the preferred embodiments of the present invention with reference to accompanying drawings.

Figure 1:
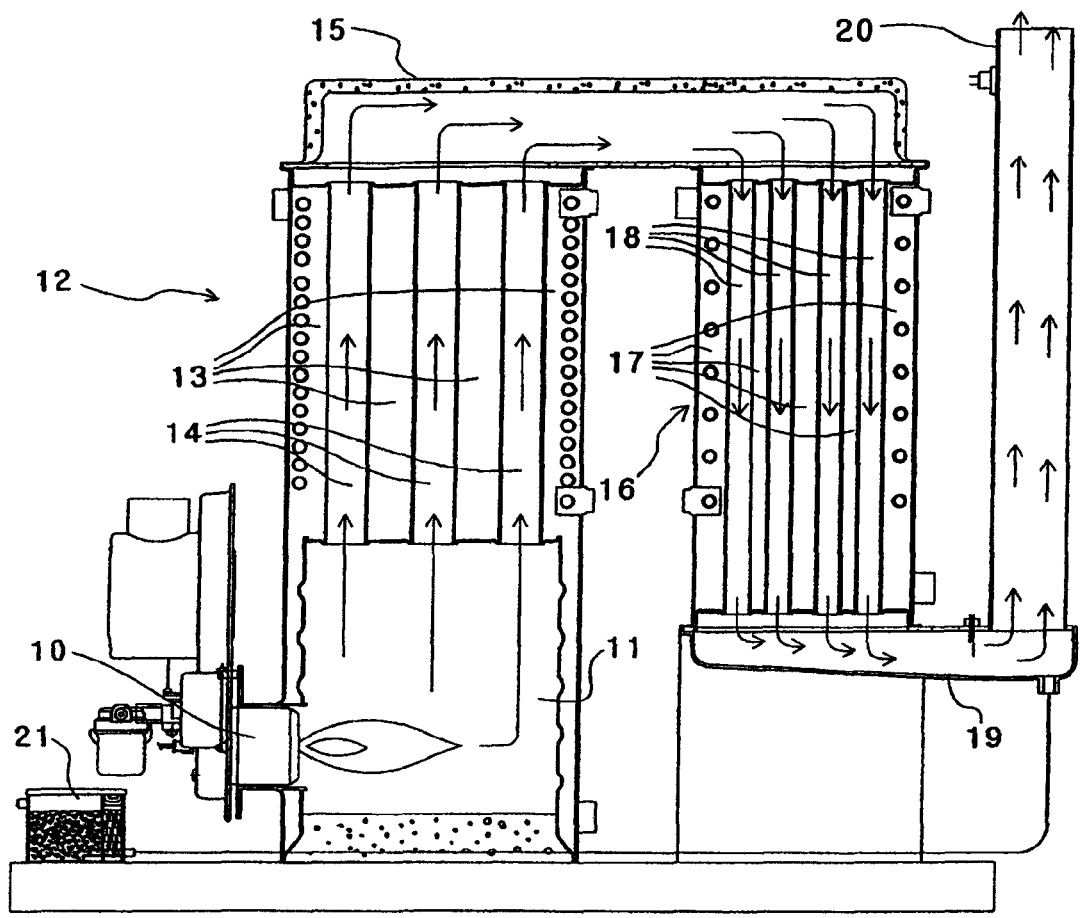
FIG. 1 is a schematic sectional view illustrating a conventional condensing type oil boiler.
Figure 2:
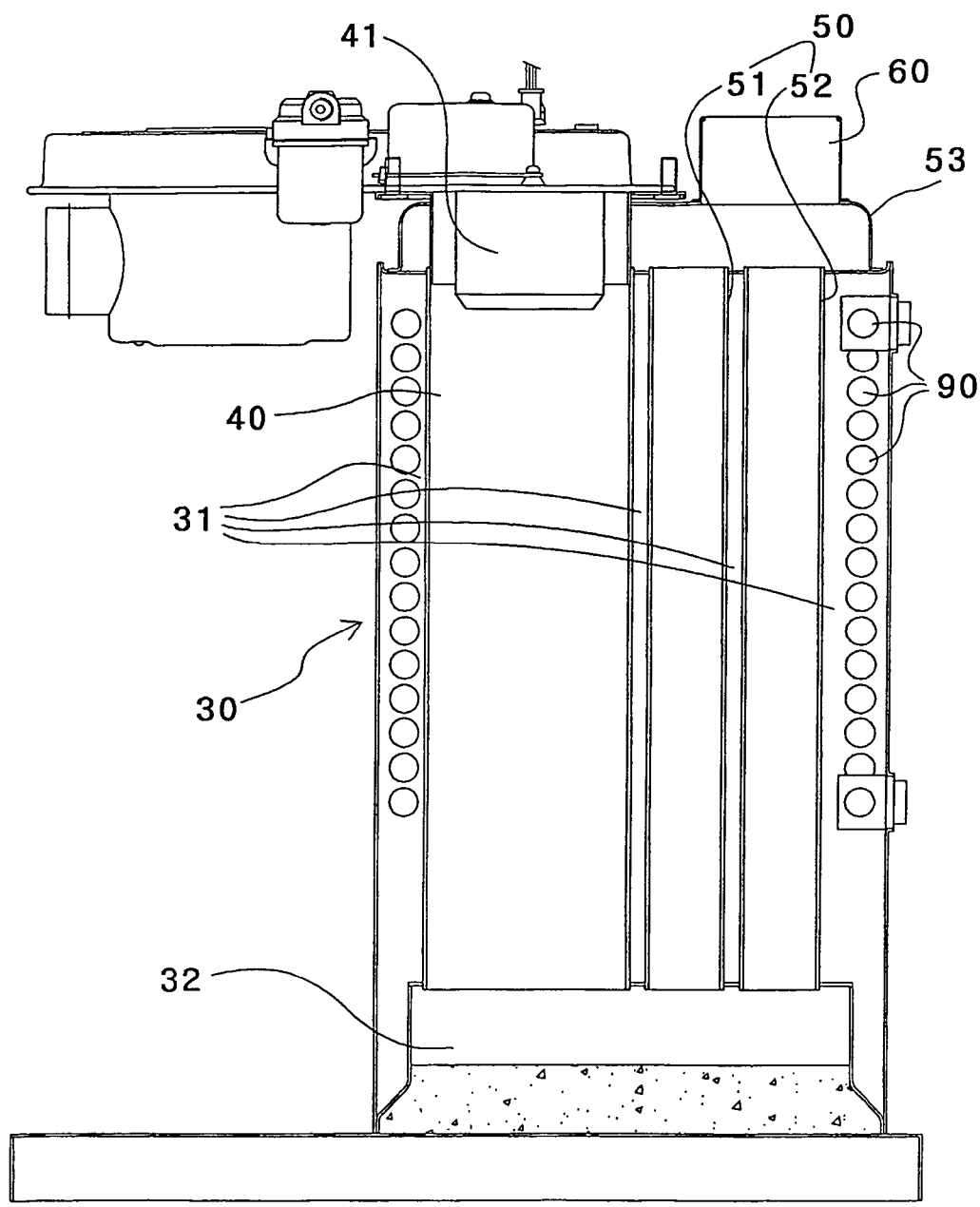
FIG. 2 is a schematic sectional view illustrating a normal type oil boiler according to one embodiment of the present invention.
Figure 3:
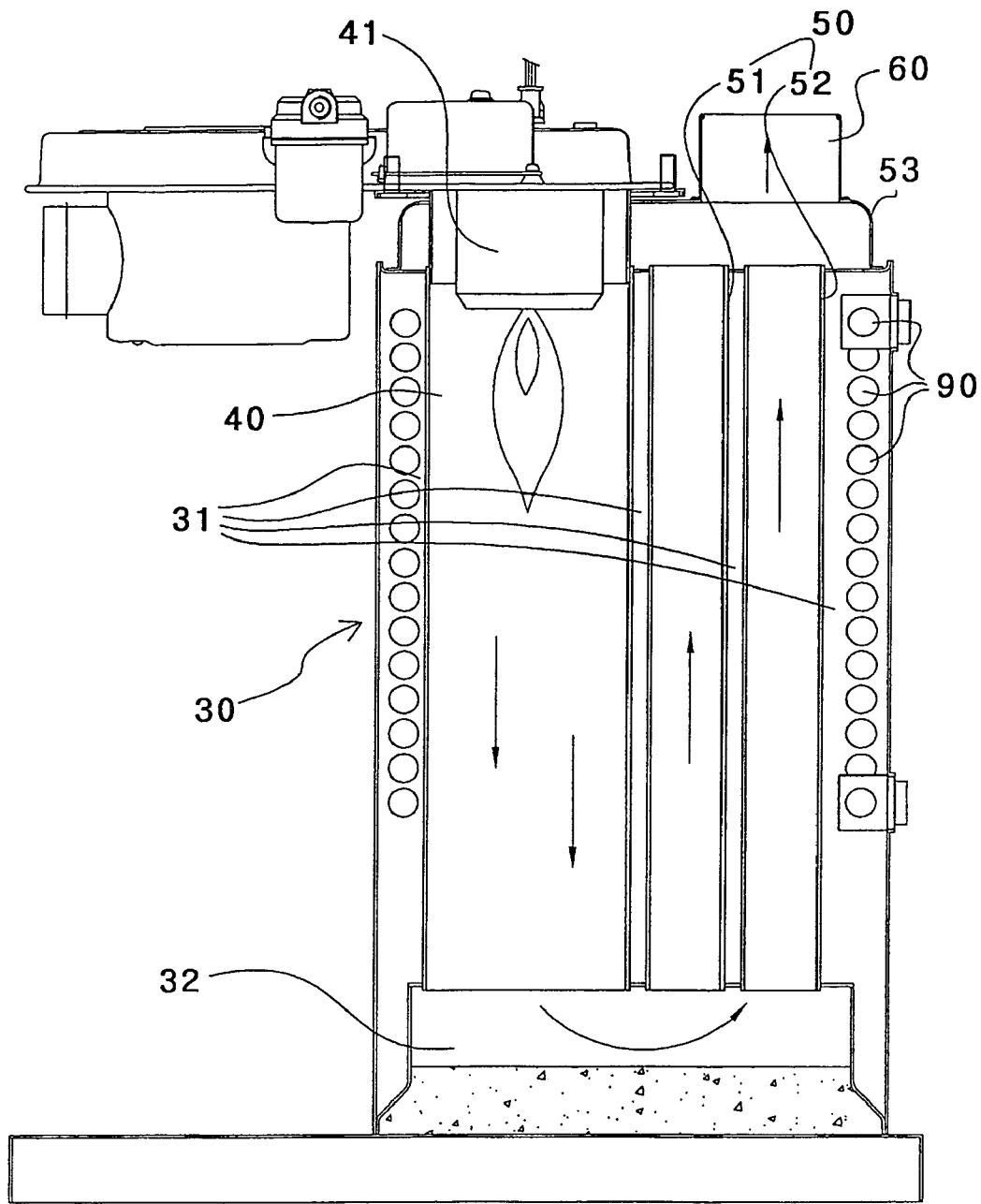
FIG. 3 is a sectional view illustrating an operational state of a normal type oil boiler according to one embodiment of the present invention.
Figure 4:
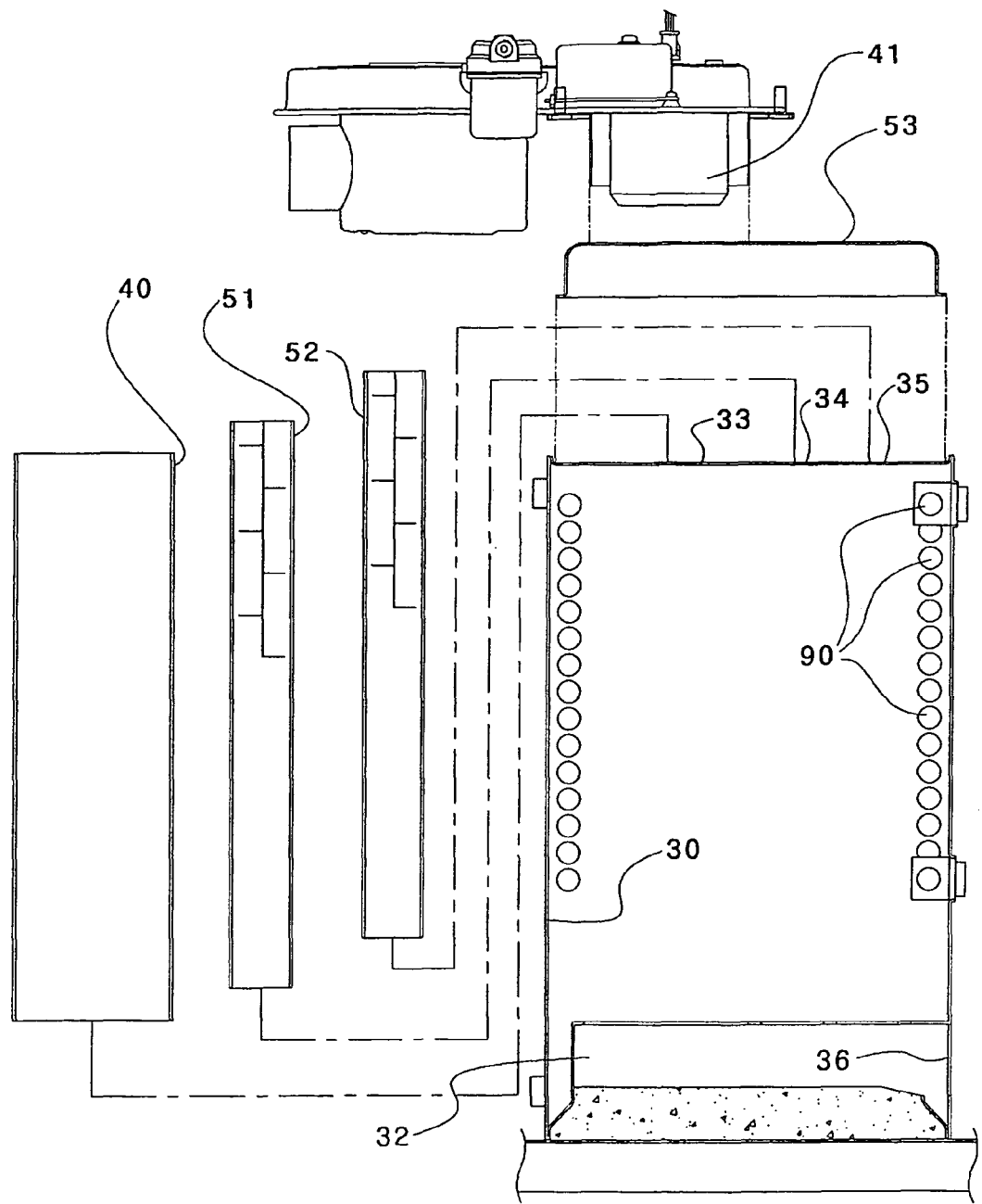
FIG. 4 is an assembled view illustrating an assembled structure of a normal type oil boiler according to one embodiment of the present invention.

FIG. 2 is a schematic sectional view illustrating a normal type oil boiler according to one embodiment of the present invention, FIG. 3 is a sectional view illustrating an operational state of the normal type oil boiler according to one embodiment of the present invention, and FIG. 4 is an assembled view illustrating an assembled structure of the normal type oil boiler according to one embodiment of the present invention.

As shown in FIGS. 2 to 4, the boiler of the present invention, which can be converted from a normal type to a condensing type or vice versa, includes a combustion chamber 40 and a heat exchange section 50 installed in an outer housing 30 of the boiler provided at an inner portion thereof with water reservoirs 31. The outer housing 30 has a cylindrical structure having sufficient strength against internal pressure. Coupling holes 33, 34 and 35 are formed in the outer housing 30.

The combustion chamber 40 has a hollow cylindrical structure, upper and lower portions of which are opened. A burner 41 is provided at an upper portion of the combustion chamber 40 so as to generate heat in a downward direction thereof. The combustion chamber 40 is accommodated in the coupling hole 33 in such a manner that a lower portion of the combustion chamber 40 is communicated with a circulation chamber 32 provided at a lower portion of the outer housing 30 of the boiler. High-temperature combustion heat, which is generated when fuel is burned in the combustion chamber 40, is transferred to water through the heat exchange section 50 when water is moved from the water reservoirs 31, so that hot water is fed into required places.

The above outer housing 30, the combustion chamber 40 and the heat exchange section 50 are also provided in a conventional normal type oil boiler. However, according to the present invention, structures of the combustion chamber 40 and the heat exchange section 50 are improved in such a manner that the boiler can be easily converted from the normal type oil boiler to the condensing type oil boiler or vice versa.

That is, the heat exchange section 50 includes a first heat exchanger 51 and a second heat exchanger 52, which can be converted into a main heat exchanger and a latent heat exchanger of the condensing type oil boiler. In addition, the combustion chamber 40, the first heat exchanger 51 and the second heat exchanger 52 are vertically accommodated in the coupling holes 33, 34 and 35 of the outer housing 30, respectively. In addition, the outer housing 30 of the boiler is provided at the lower portion thereof with the circulation chamber 32. An insertion hole 36 is formed at a lateral portion of the outer housing 30. In addition, a noise-absorbing container 53 and a funnel 60 are coupled to an upper portion of the outer housing 30.

Therefore, as shown in FIG. 3, fuel is burned in the combustion chamber 40 by means of the burner 41 provided at the upper portion of the combustion chamber 40 such that the burner 41 can generate heat in the downward direction towards the fuel. In addition, the high-temperature exhaust gas derived from the combustion of fuel is discharged to the exterior by way of the circulation chamber 32, the heat exchange section 50, the noise-absorbing container 53 and the funnel 60. At this time, since the circulation chamber 32 is connected to both first and second heat exchangers 51 and 52 of the heat exchange section 50, the exhaust gas introduced in the circulation chamber 32 is dispersed into the first and second heat exchangers 51 and 52 of the heat exchange section 50. Then, the exhaust gas is collected in the noise-absorbing container 53 and is discharged to the exterior through the funnel 60.

In the meantime, a hot water heat exchanger 90 is installed at an inner peripheral portion of the outer housing 30 in the form of a coil pattern in such a manner that a user can use hot water by circulating water through the hot water heat exchanger 90 regardless of heating water used for heating a room.

According to the normal type boiler having the above structure, the first and second heat exchangers 51 and 52 can be easily converted into a main heat exchanger 51' and a latent heat exchanger 52' when the normal type boiler is converted into the condensing type boiler. Hereinafter, a procedure for converting the normal type boiler into the condensing type boiler will be described in detail.

Figure 5:
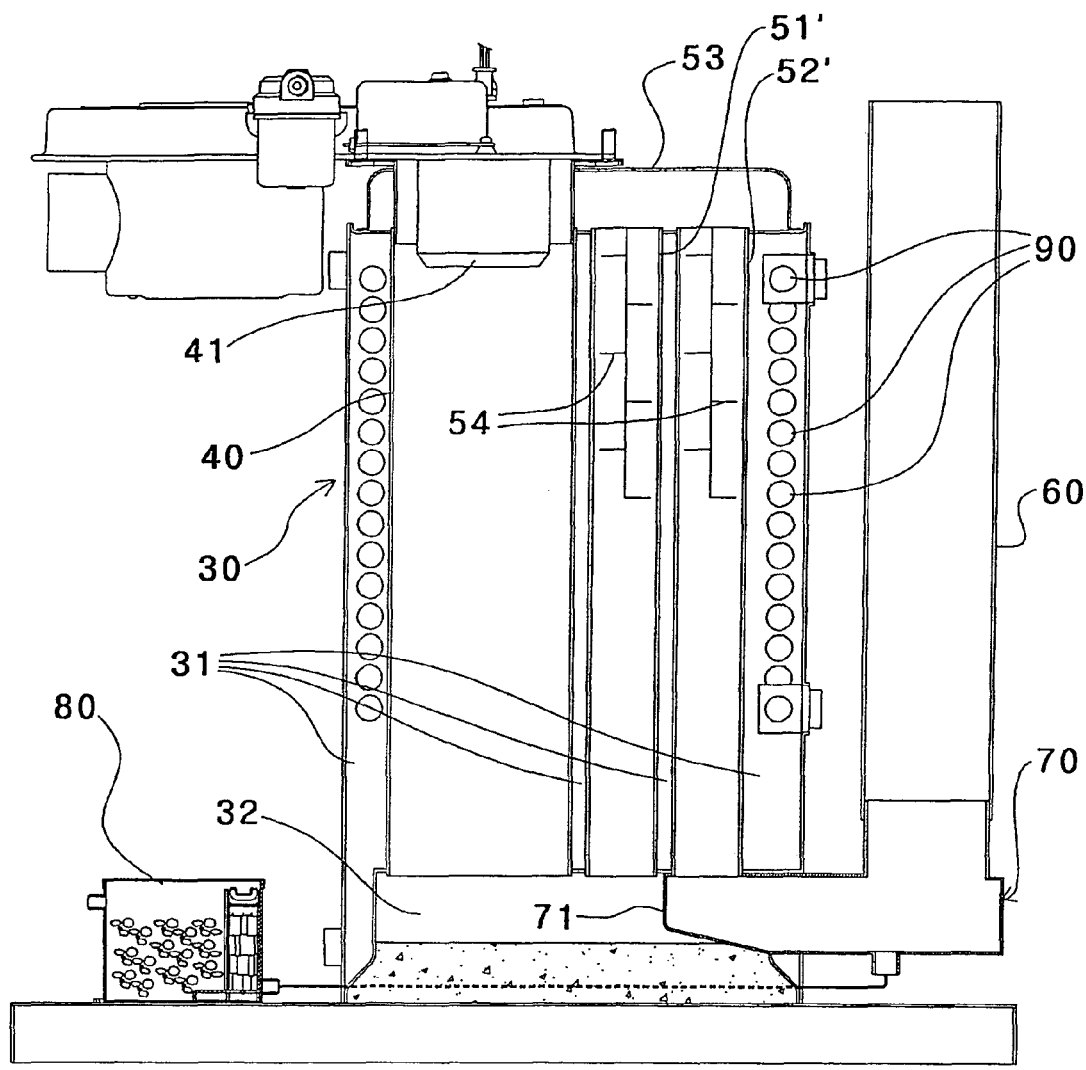
FIG. 5 is a schematic sectional view of a condensing type oil boiler according to one embodiment of the present invention.
Figure 6:
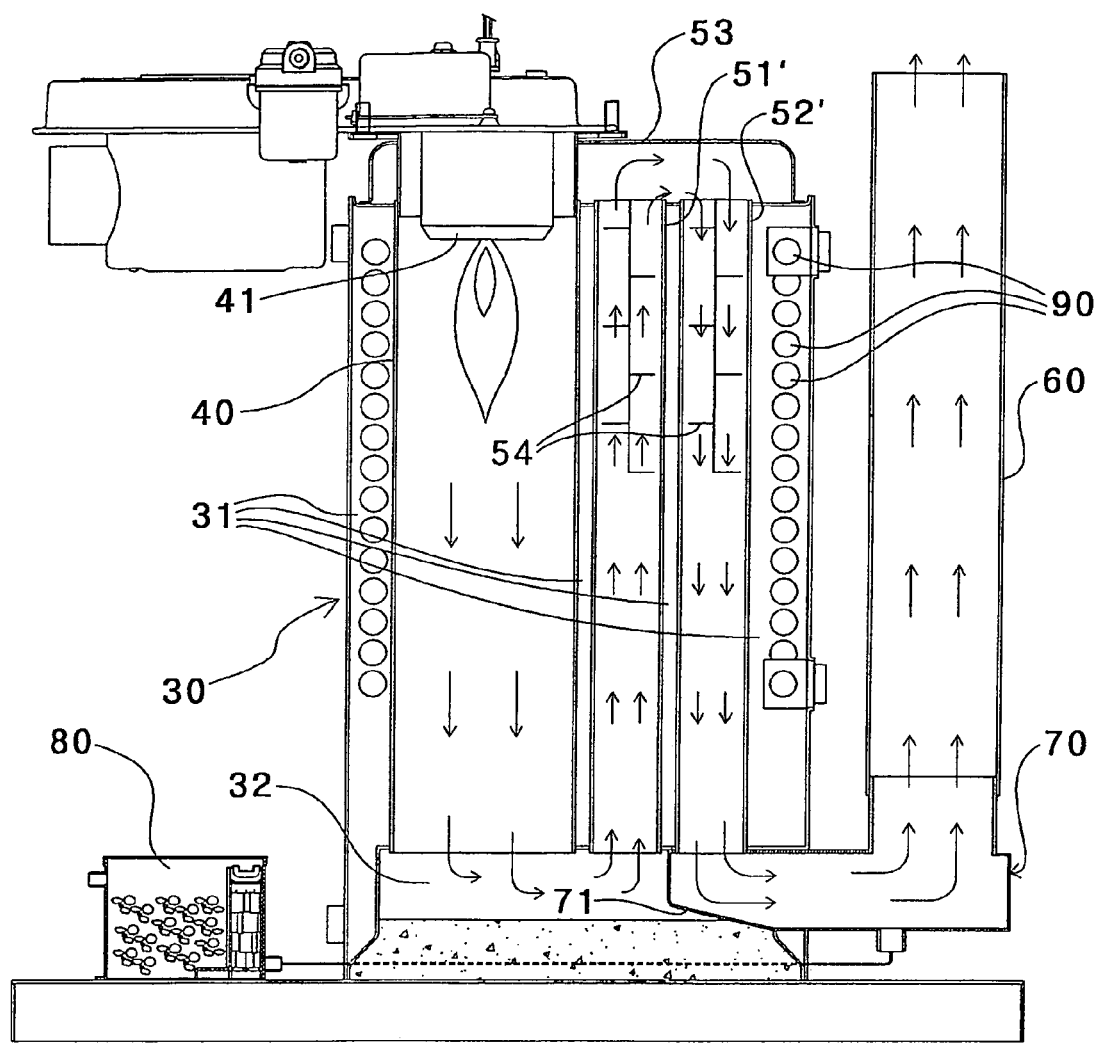
FIG. 6 is a sectional view illustrating an operational state of a condensing type oil boiler according to one embodiment of the present invention.

FIGS. 5 and 6 are a schematic sectional view and an operational view of the condensing type oil boiler which is converted from the normal type oil boiler as shown in FIGS. 2 and 3. As shown in FIGS. 5 and 6, the condensing type oil boiler also includes the outer housing 30 formed at an inner portion thereof with coupling holes 33, 34 and 35, the combustion chamber 40 and the burner 41, which are identical to those of the normal type oil boiler.

The main heat exchanger 51' and the latent heat exchanger 52' are identical to the first and second heat exchangers 51 and 52 of the normal type oil boiler. Accordingly, the main heat exchanger 51' and the latent heat exchanger 52' are vertically accommodated in the coupling holes 34 and 35 of the outer housing 30 of the boiler.

In this case, the latent heat exchanger 52' is aligned adjacent to the main heat exchanger 51' and a lower portion of the latent heat exchanger 52' is communicated with a funnel support 70, which is inserted into the circulation chamber 32 from a lateral portion of the outer housing 30 of the boiler.

One end of the funnel support 70 is inserted into the insertion hole 36 formed at the lateral portion of the outer housing 30 of the boiler so as to communicate with the latent heat exchanger 52', and the other end of the funnel support 70 is communicated with the funnel 60 used for discharging the exhaust gas to the exterior. In addition, a partition wall 71 is formed at a front end of the funnel support 70 so as to prevent the latent heat exchanger 52' from being communicated with the main heat exchanger 51' in the circulation chamber 32.

The noise-absorbing container 53 is provided at the upper portion of the outer housing 30. The noise-absorbing container 53 seals the upper portion of the outer housing 30 while forming a cavity therebetween so that the exhaust gas can be introduced into the latent heat exchanger 52' from the main heat exchanger 51'.

Differently from the normal type oil boiler shown in FIG. 2, the condensing type oil boiler shown in FIG. 5 further includes the funnel support 70 and a neutralization unit 80. In addition, the funnel 60 is connected to the funnel support 70 instead of the noise-absorbing container 53.

That is, the funnel support 70 is fixedly inserted into the circulation chamber 32 from the lateral portion of the outer housing 30, the funnel 60 is separated from the noise-absorbing container 53 such that the upper portion of the noise-absorbing container 53 is sealed, and the separated funnel 60 is connected to the funnel support 70, thereby converting the normal type oil boiler into the condensing type oil boiler.

In particular, it should be noted that partition walls 54 and 71 are formed by means of the funnel support 70 in such a manner that the circulation chamber 32 is shielded from the latent heat exchanger 52'. Hereinafter, an operation of the condensing type oil boiler according to the present invention will be described with reference to FIG. 6.

First, fuel is burned in the combustion chamber 40 having the burner 41 and the high-temperature exhaust gas derived from the combustion of fuel is introduced into the circulation chamber 32. Since the circulation chamber 32 is shielded from the latent heat exchanger 52' due to the partition walls 54 and 71 formed by means of the funnel support 70, the exhaust gas introduced into the circulation chamber 32 is transferred only to the main heat exchanger 51', which is different from the flowing path of the exhaust gas shown in FIG. 3. Therefore, when the normal type oil boiler is converted into the condensing type oil boiler, the first exchanger 51 is converted into the main heat exchanger 51' for feeding sensible heat of the exhaust gas to water flowing through the water reservoirs 31. Differently from the noise-absorbing container 53 as shown in FIG. 3, in which upper and lower portions of the noise-absorbing container 53 are opened so that the heat exchange section 50 is communicated with the funnel 60 through the noise-absorbing container 53, the upper portion of the noise-absorbing container 53 shown in FIG. 5 is sealed so that the main heat exchanger 51' is communicated with the latent heat exchanger 52' through the noise-absorbing container 53, thereby the exhaust gas passing through the noise-absorbing container 53 is introduced into the latent heat exchanger 52'. The second heat exchanger 52 of the normal type oil boiler shown in FIG. 3 has a function substantially identical to that of the first heat exchanger 51. However, in the condensing type oil boiler, the latent heat exchanger 52' may receive the exhaust gas that has been heat-exchanged while passing through the main heat exchanger 51', so a heat exchange is carried out with respect to latent heat according to the state of water vapor contained in the exhaust gas. The exhaust gas that has passed through the latent heat exchanger 52' is discharged to the exterior by way of the funnel support 70 and the funnel 60.

In addition, the funnel support 70 can be used as a condensing water collector. Generally, in the condensing type oil boiler, water is converted into condensing water having a storing acidic property while passing through the latent heat exchanger 52', causing environmental contamination. In order to solve the above problem, the present invention provides the condensing water collector for collecting the condensing water and the neutralization unit 80 for neutralizing the condensing water stored in the condensing water collector. The funnel support 70 is connected to the neutralization unit 80 in such a manner that the condensing water stored in the funnel support 70 can be introduced into the neutralization unit 80. At this time, the funnel support 70 forms the partition walls 54 and 71 so as to allow the normal type oil boiler to be converted into the condensing type oil boiler and so as to collect the condensing water after the normal type oil boiler has been converted into the condensing type oil boiler.

The condensing type oil boiler according to the present invention can be variously modified in use. For instance, the hot water heat exchanger 90 can be installed at the inner peripheral portion of the outer housing of the boiler in the form of a coil pattern in such a manner that a user can use hot water by circulating water through the hot water heat exchanger 90 regardless of heating water used for heating a room. In addition, a baffle can be installed in the main heat exchanger 51' or the latent heat exchanger 52' in order to delay the flow of the exhaust gas. In this case, a heat exchange time between the exhaust gas and hot water may increase so that thermal efficiency can be improved.

INDUSTRIAL APPLICABILITY

As can be seen from the foregoing, according to the boiler of the present invention, which is convertible between a normal type and a condensing type, the structure of the normal type boiler is designed substantially identical to the structure of the condensing type boiler, so it is not necessary to provide separate manufacturing equipment according to the types of the boiler. In addition, it is possible to commonly use parts in both types of the boiler, so the manufacturing cost for the boiler can be significantly reduced.

Furthermore, the combustion chamber, the main heat exchanger and the latent heat exchanger are integrally installed in the outer housing of the boiler so that the volume and the weight of the boiler can be reduced. Since the combustion chamber, the main heat exchanger and the latent heat exchanger are vertically accommodated in the outer housing of the boiler, the boiler of the present invention can be easily fabricated.

While this invention has been described in connection with what is presently considered to be the most practical and preferred embodiment, it is to be understood that the invention is not limited to the disclosed embodiment and the drawings, but, on the contrary, it is intended to cover various modifications and variations within the spirit and scope of the appended claims.

The invention claimed is:

1. A boiler convertible between a normal type and a condensing type, the boiler comprising:
    a combustion chamber for generating high-temperature combustion heat by burning fuel therein;
    a heat exchange section for applying heat to heating water by absorbing the high-temperature combustion heat; and
    an outer housing formed at an inner portion thereof with a water reservoir for circulating the heating water, wherein coupling holes are formed in the outer housing, a circulation chamber is formed at a lower portion of the outer housing, a burner is provided at an upper portion of the combustion chamber so as to generate heat in a downward direction thereof, the combustion chamber is vertically installed in one of the coupling holes, a lower portion of the combustion chamber is communicated with the circulation chamber, the heat exchange section includes first and second heat exchangers and is vertically installed in the outer housing adjacent to the combustion chamber, an upper portion of the heat exchange section is coupled to one of the coupling holes and a lower portion of the heat exchange section is communicated with the circulation chamber, an insertion hole is formed at a lateral portion of the outer housing to insert a funnel support when converting a normal type boiler into a condensing type boiler, and a funnel is provided at an upper portion of the outer housing so as to discharge an exhaust gas derived from combustion of the fuel in the combustion chamber, and a noise-absorbing container is provided at the upper portion of the outer housing so as to connect the funnel with the outer housing, and the funnel is separable from the noise-absorbing container.

2. A boiler convertible between a normal type and a condensing type, the boiler comprising:
    a combustion chamber for generating high-temperature combustion heat by burning fuel therein;

a heat exchange section including a main heat exchanger for absorbing sensible heat from the high-temperature combustion heat and a latent heat exchanger for absorbing remaining heat and latent heat from an exhaust gas outputted from the main heat exchanger, the heat exchange section applying heat to heating water; and an outer housing formed at an inner portion thereof with a water reservoir for circulating the heating water, wherein coupling holes are formed in the outer housing, a circulation chamber is formed at a lower portion of the outer housing, the combustion chamber is vertically installed in one of the coupling holes, a burner is provided at an upper portion of the combustion chamber so as to generate heat in a downward direction thereof, a lower portion of the combustion chamber is communicated with the circulation chamber, the main heat exchanger is vertically installed in the outer housing adjacent to the combustion chamber, the main heat exchanger is accommodated in one of the coupling holes and a lower portion of the main heat exchanger is communicated with the circulation chamber, the latent heat exchanger is vertically installed in the outer housing adjacent to the main heat exchanger and is accommodated in one of the coupling holes, a lower portion of the latent heat exchanger is shielded from the circulation chamber by means of a partition wall formed in the circulation chamber, a funnel is communicated with the latent heat exchanger through a funnel support so as to discharge an exhaust gas of the latent heat exchanger to an exterior, and a noise absorbing chamber is coupled to an upper portion of the outer housing so as to seal the upper portion of the outer housing while guiding the exhaust gas from the main heat exchanger to the latent heat exchanger, and the partition wall is defined by an outer peripheral portion of the funnel support inserted into the circulation chamber from a lateral portion of the outer housing.

3. The boiler as claimed in claim 2, wherein the funnel support discharges condensing water generated from the latent heat exchanger and the funnel towards a neutralization unit.

4. The boiler as claimed in claim 2, wherein the outer housing is provided at an outer peripheral portion thereof with a hot water heat exchanger.

5. A method for converting a normal type oil boiler into a condensing type oil boiler or vice versa by using a convertible boiler as claimed in claim 1, the method comprising the steps of:

inserting a funnel support into a circulation chamber from a lateral portion of an outer housing of the boiler, thereby forming a partition wall for shielding the circulation chamber from a latent heat exchanger;

separating a funnel from a noise-absorbing container and sealing an upper portion of the noise-absorbing container; and allowing the funnel to communicate with the latent heat through the funnel support in such a manner that a main heat exchanger absorbs sensible heat from an exhaust gas and the latent heat exchanger absorbs latent heat from the exhaust gas while the exhaust gas is being circulated through a combustion chamber, the circulation chamber, the noise-absorbing container, the latent heat exchanger, the funnel support and the funnel.

* * * * *